United States Patent [19]

Clift

[11] Patent Number: 5,216,240
[45] Date of Patent: Jun. 1, 1993

[54] FIBER OPTICAL SENSOR HAVING A PLURALITY OF SETS OF ACTUATION MEANS WITH DIFFERENT NATURAL VIBRATIONAL FREQUENCIES

[75] Inventor: Stephen A. Clift, Swindon, United Kingdom

[73] Assignee: Focus Limited, Wiltshire, United Kingdom

[21] Appl. No.: 939,071

[22] Filed: Sep. 1, 1992

[30] Foreign Application Priority Data

Sep. 3, 1991 [GB] United Kingdom ............... 9118780

[51] Int. Cl.$^5$ .............................................. H01J 5/16
[52] U.S. Cl. ........................... 250/227.16; 250/227.21; 250/231.19
[58] Field of Search ...................... 250/227.21, 227.16, 250/227.17, 227.18, 227.19, 227.14, 231.19; 73/705-708, 720, 800; 359/341

[56] References Cited

U.S. PATENT DOCUMENTS

| | | | |
|---|---|---|---|
| 4,071,753 | 1/1978 | Fulenwider et al. | 250/227 |
| 4,359,637 | 11/1982 | Perren | 250/227 |
| 4,778,248 | 10/1988 | Arzur et al. | 350/96.29 |
| 5,072,113 | 12/1991 | Martinelli et al. | 250/227.16 |
| 5,126,558 | 6/1992 | Rogers, Jr. et al. | 250/227.21 |

FOREIGN PATENT DOCUMENTS

| | | | |
|---|---|---|---|
| 2161931A | 7/1985 | United Kingdom | 11/26 |
| 2176364B | 7/1985 | United Kingdom | 11/00 |
| 2190185B | 5/1986 | United Kingdom | 21/84 |

Primary Examiner—David C. Nelms
Assistant Examiner—Que T. Le
Attorney, Agent, or Firm—Kinney & Lange

[57] ABSTRACT

The present invention relates to a sensor comprising an optical fibre (2), a light source (1) for passing light through the fibre (2), a plurality of sets of actuating means (3), each set having one or more actuation means (3) connecting the fibre (2) to a respective device to be monitored, each actuation means (3) within a set having a stored vibrational energy which is released to modulate the light in the optical fibre (2) when a parameter of the device to which it is connected changes by a predetermined amount and means (4,5,6 and 7) for converting the optical signal into an electrical signal wherein each set of actuation means (3) has a different natural vibrational frequency thus enabling the sensor to detect from which device the vibration originated by monitoring the change in transmitted light.

12 Claims, 5 Drawing Sheets

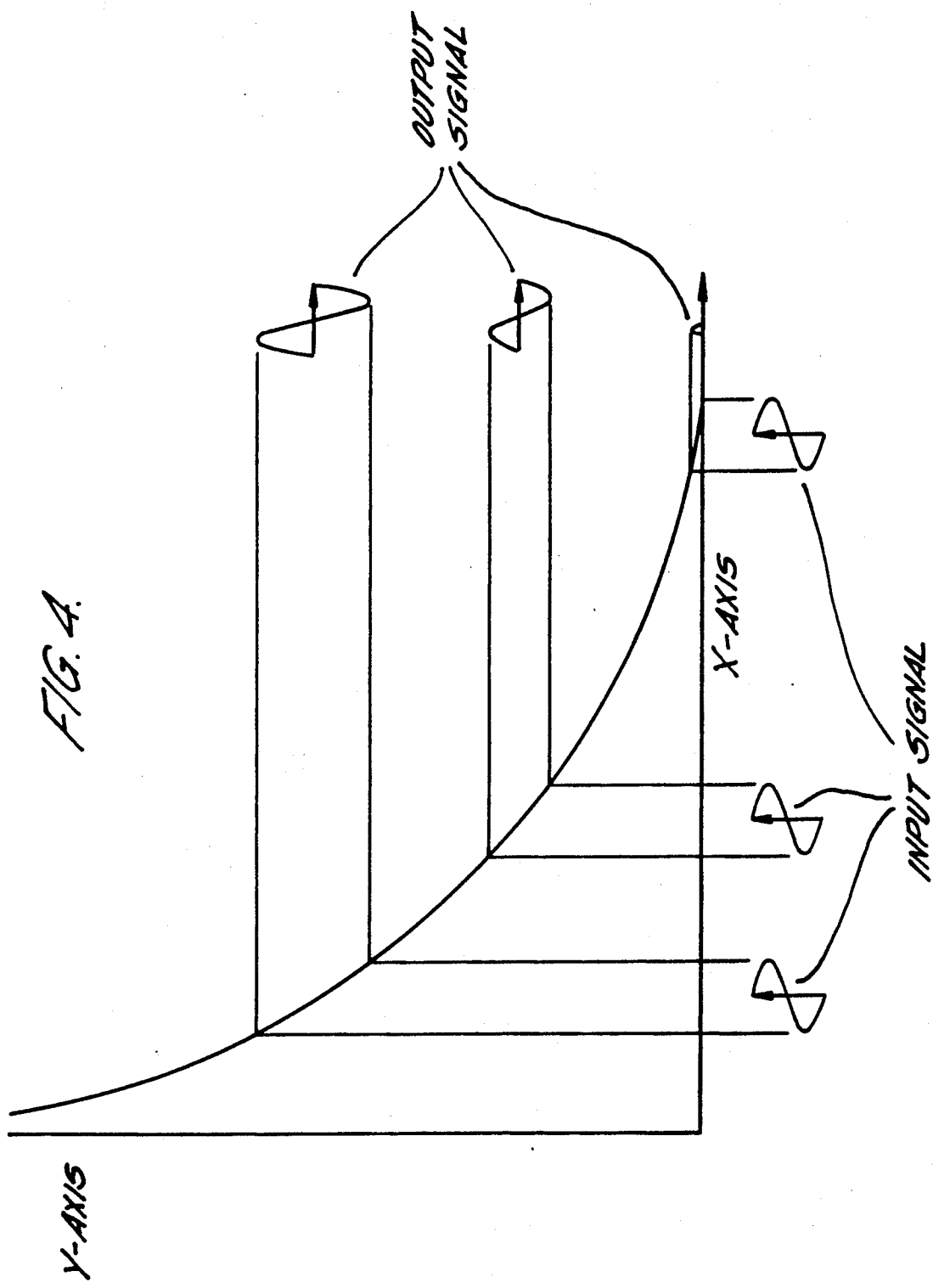

FIBER OPTICAL SENSOR HAVING A PLURALITY OF SETS OF ACTUATION MEANS WITH DIFFERENT NATURAL VIBRATIONAL FREQUENCIES

The present invention relates to a sensor, in particular, a fibre optic sensor.

Optical fibres are waveguides for electromagnetic radiation at the wavelengths/frequencies of light. Optical fibres are now used in many fields but are particularly suitable as sensors. A physical perturbation of an optical fibre can result in a change in the light transmitted along the fibre which can be converted, for example, by means of an optical/electrical converter into an electrical signal which can be readily measured.

This type of sensor can be activated by a chosen parameter of a device, for example, pressure, temperature, liquid level, or concentration of a gas within a chemical. When such a parameter reaches a predetermined value or level, the device will be arranged to act upon the optical fibre to which it is connected. Information could be conveyed to the optical fibre in one of the following ways:

a. microbending the optical fibre to cause a change in the light level detected by a continuous wave DC emitter/detector system;

b. changing the polarisation state of a single mode optical fibre by stressing the fibre eg compressing or twisting. The signal through the polarised analyser of a continuous wave DC emitter/detector system will change when a device acts upon the optical fibre.

To form a more distributed sensor a single optical fibre could be connected to several perturbation-inducing devices having one or more parameters which are to be monitored but the problem which is encountered with this arrangement is one of identifying which device has caused the perturbation.

GB 2176364 attempts to overcome the problem of identifying which of a number of devices has caused the perturbation by employing a double-mode optical fibre and light energy having a time-varying frequency and then comparing the frequencies of the two different-mode outputs of the optical fibre (which travel at different speeds) to determine the delay and hence the distance back along the fibre to the perturbation point. The disadvantage of such a sensor is that it requires the use of a double-mode fibre which is extremely expensive in comparison to a standard single-mode fibre, thus the resulting sensor will be expensive particularly if long lengths of fibre are required. In addition, because the sensing is carried out by simply deforming the fibre, any deformation caused by a source other than the intended perturbation points will give a signal which may be considered as the genuine signal.

Accordingly, great care must be taken to ensure that the fibre can only be deformed in areas where sensing is required. Furthermore, the light source cannot be a simple DC laser, but must be driven by an oscillator circuit and a linear "saw tooth" ramp which is critical to the accuracy of the device—any variation in the input over a period of time will cause a drift in the calibration.

GB 2190185 relies on a phase difference between two waves to produce beat frequencies characteristic of where light in the fibre has been modulated. This sensor also suffers from the drawbacks mentioned in connection with GB 2176364. In this sensor the light in the fibre is amplitude modulated by a sensor element at a frequency which is a function of the value of the measured parameter. However, this patent only describes how to do this extrinsically in an interruptive manner. A further problem is that in order to modulate the light amplitude as a function of the value of the parameter being measured, a continuous and constant energy supply is required. This would typically be an electrical power supply but this would mean foregoing one of the main advantages of an optical fibre which is that it can be electrically isolated.

Both GB 2176364 and GB 2190185 describe systems which would have a calibration problem because the location of the perturbation measured by the receiving electronics is dependant on the length of fibre used. Consequently, each system would have to be constructed "on site" once all the fibre optic cabling had been installed.

Thus the known fibre optic sensors have several drawbacks and there is, therefore, a demand for a solution to the problems encountered in known sensors of this kind.

Accordingly, the present invention provides a sensor comprising an optical fibre, a light source for passing light through the fibre, a plurality of sets of actuation means, each set having one or more actuation means connecting the fibre to a respective device to be monitored, each actuation means within a set having a stored vibrational energy which is released to modulate the light in the optical fibre when a parameter of the device to which it is connected changes by a predetermined amount and means for converting the optical signal into an electrical signal wherein each set of actuation means has a different natural vibrational frequency thus enabling the sensor to detect from which device the vibration originated by monitoring the change in transmitted light.

Since each set of actuation means has a different natural vibrational frequency it is relatively simple to identify from which device the vibration has originated without complex calculations.

Preferably, each actuation means comprises a biased spring means which is released when a parameter of the device to which it is connected changes by a predetermined amount.

Preferably, one end of the spring means is connected to the optical fibre.

Preferably, the vibration of the spring means causes a bending of the optical fibre.

Preferably, the optical fibre is arranged as an arc or a loop within the actuation means, one end being fixed to the housing of the actuation means and the other end being connected to the spring means.

Preferably, the transmitted light is amplitude modulated extrinsically.

Preferably, the sensor further comprises a beam splitter/mirror arrangement to enable the light source and means for converting the optical signal to an electrical signal to be at the same location thus requiring only a single length of optical fibre.

Preferably, the sensor senses amplitude modulation of light.

Preferably, the sensor senses polarisation modulation of light.

Preferably, the sensor senses temperature, pressure or current in a high voltage environment.

Preferably, the sensor senses pressure in high voltage capacitors.

Preferably, one or more of the actuation means are provided with a visible indicator which identifies which actuation means has been activated.

Preferred embodiments of the present invention will now be described in detail, by way of example only, with reference to the accompanying drawings, of which:

FIG. 4 depicts graphically how the attenuation of the fibre optic loop varies with the radius of the fibre optic loop;

Figure 1:
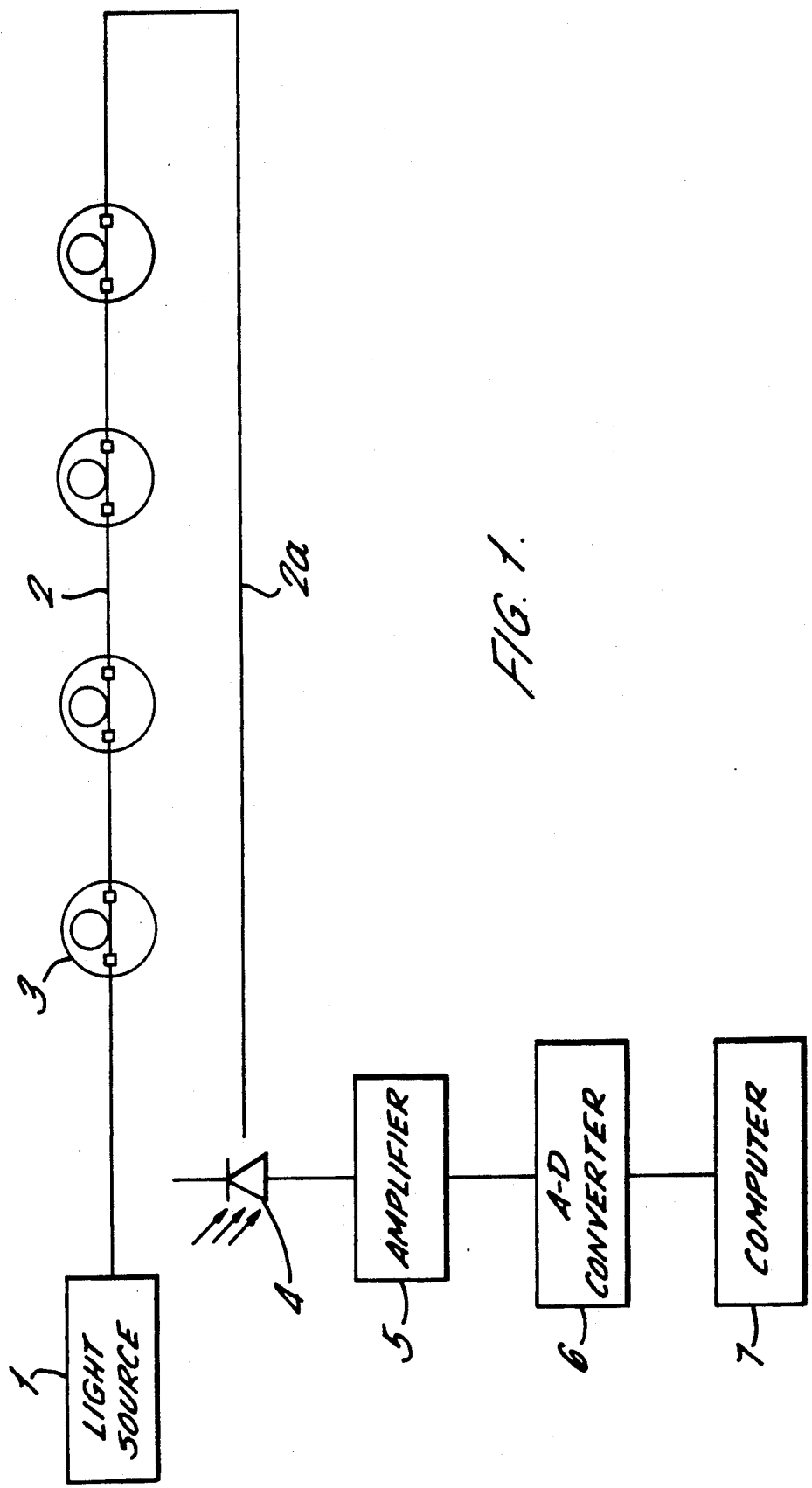
FIG. 1 is a schematic diagram of a sensor according to a first preferred embodiment.

FIG. 1 depicts a typical sensor according to the present invention. The sensor comprises a constant DC light source 1 which passes light continuously through one end of a single fibre optic 2. A number of actuation devices 3 are attached to the fibre 2 in a non-interruptive manner at known positions, for example, the actuation devices 3 could be located in different rooms in a building. Each actuation device 3 is connected to a device which is to be monitored by the sensor. The fibre 2 is connected at its other end to a photodiode 4, an amplifier 5, an A/D converter 6 and a computer 7. The photodiode 4, amplifier 5, A/D converter 6 and computer 7 form the detection electronics. The light source 1 and detection electronics 4, 5, 6 and 7 in FIG. 1 are located in the same place so that a return fibre 2a is required but an alternative arrangement is depicted in FIG. 2 (described hereafter).

Each actuation device 3 can have a different stored mechanical vibrational energy with a different natural frequency which is released when a parameter or parameters of the device (not shown) to be monitored change by a predetermined amount. The mechanical vibrational energy will be transmitted to the fibre 2 and seen as a damped harmonic signal. A signal which is incident on the photodiode 4 will be amplified by amplifier 5 to produce a voltage proportional to the power incident on the photodiode 4. The voltage will then be digitised by the A/D converter 6 and fed to computer 7 which will use fourier analysis to analyse the signal. The computer 7 will have a record of the location and natural vibrational frequency of each actuation device 3 in its memory to enable it to make a preprogrammed decision as to where and what action is to be taken.

Figure 2:
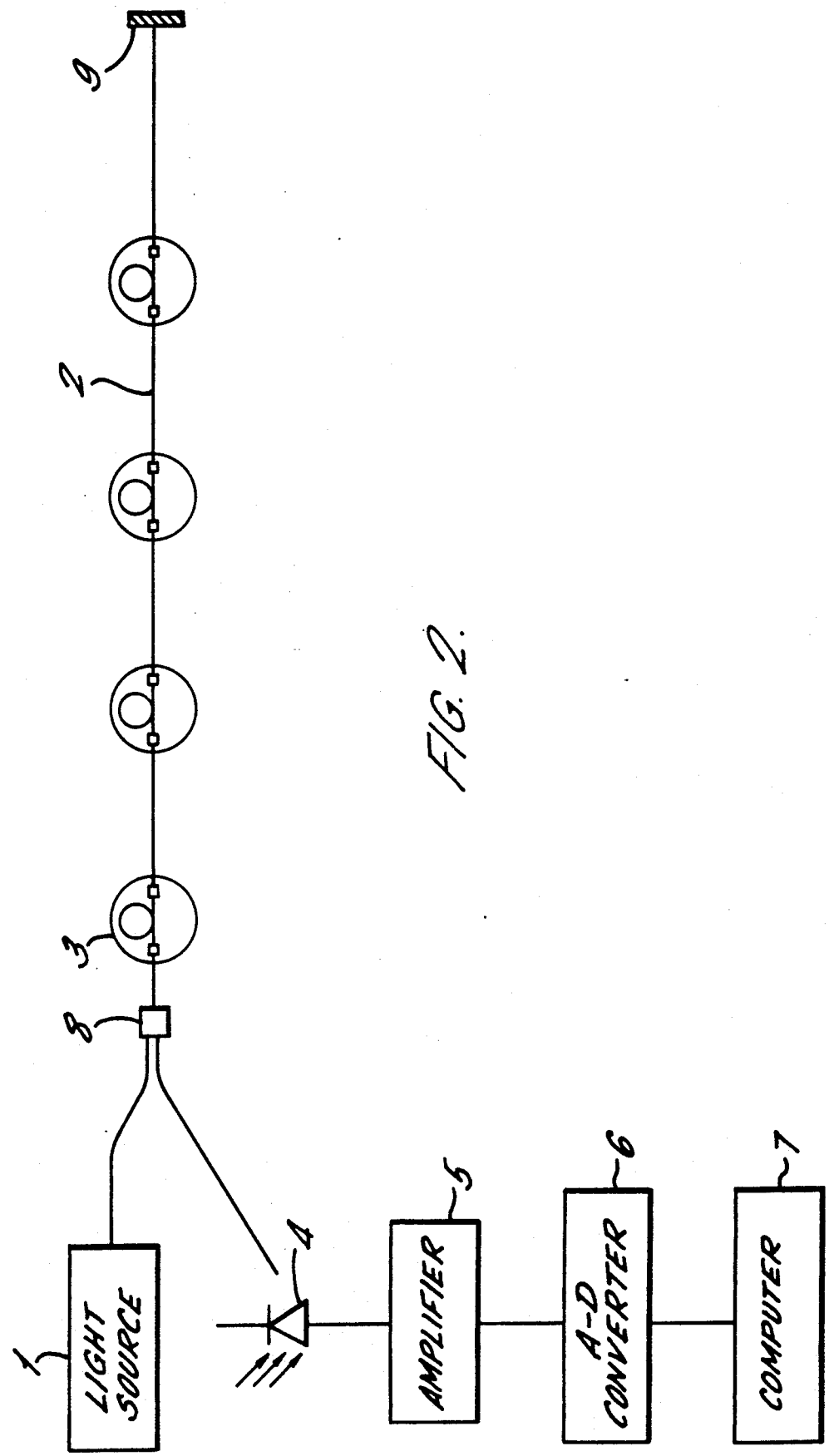
FIG. 2 is a schematic diagram of a sensor according to a second preferred embodiment.

FIG. 2 depicts an alternative arrangement where only a single fibre 2 is used (i.e no return fibre 2a as in FIG. 1). A mirror 9 is located at the end of the fibre 2 which reflects the signal back down the fibre so that it undergoes modulation twice. The time delay caused by the extra distance which the reflected light travels will have a negligible effect on the output signal for fibre lengths of a few kilometers and vibration frequencies less than 1000 Hz which are typical. The amplitude of the modulated signal will, however, be approximately doubled which helps detection. The signal will then be fed to a beam splitter 8 and to the detection electronics 4, 5, 6 and 7 in the same way as described in connection with FIG. 1.

Although FIGS. 1 and 2 depict actuation devices 3 each having a different natural vibrational frequency for connection to different devices to be monitored, an alternative arrangement would be to place "sets" of actuation devices 3 at known positions on the fibre 2. Each actuation device within a "set" would have the same natural vibrational frequency and would be dependent upon a different parameter of the device to which the set was connected. For example, if the device being monitored is a capicitor bank, each actuation means in the set could monitor the pressure in each individual capacitor. The natural vibrational frequency of one set would be different to the other sets so that the device from which the vibration originated could be detected as described earlier. If the devices are capacitor banks, for example, the capacitor bank with a faulty capacitor could be detected. Once the faulty device had been identified it could be switched out of the fibre so that the actuation devices could be inspected to determine which parameter had caused the signal. Since the range of frequencies which are available for this type of sensor is typically 20-200 HZ it will be appreciated that the number of different frequencies are quickly exhausted if each parameter of a device must have a different frequency. Hence, the arrangement of "sets" of actuation devices for each device, each with the same natural vibrational frequency provides the sensor with a greater sensing capability.

Each actuation device in a set could be provided with a flag which is visible only when the parameter of the device to which it has been connected exceeds the predetermined level and the vibrational energy is released.

An actuation device which is suitable for use in the sensor depicted in FIGS. 1 and 2 will now be described with reference to FIGS. 3a and 3b. As explained earlier, each actuation device 3 or each set of actuation devices has a different natural vibrational frequency to enable the detection electronics 4, 5, 6 and 7 to identify from where the signal has originated. The energy released by an actuation device will cause the fibre 2 to which it is attached to microbend in a damped harmonic fashion. The microbending causes the light amplitude in the fibre 2 to be modulated in the same damped harmonic fashion at the particular natural frequency of the actuation device. The energy is set to be released when a parameter of the device to which the actuation device is attached changes by a preset critical amount.

Figure 3A:
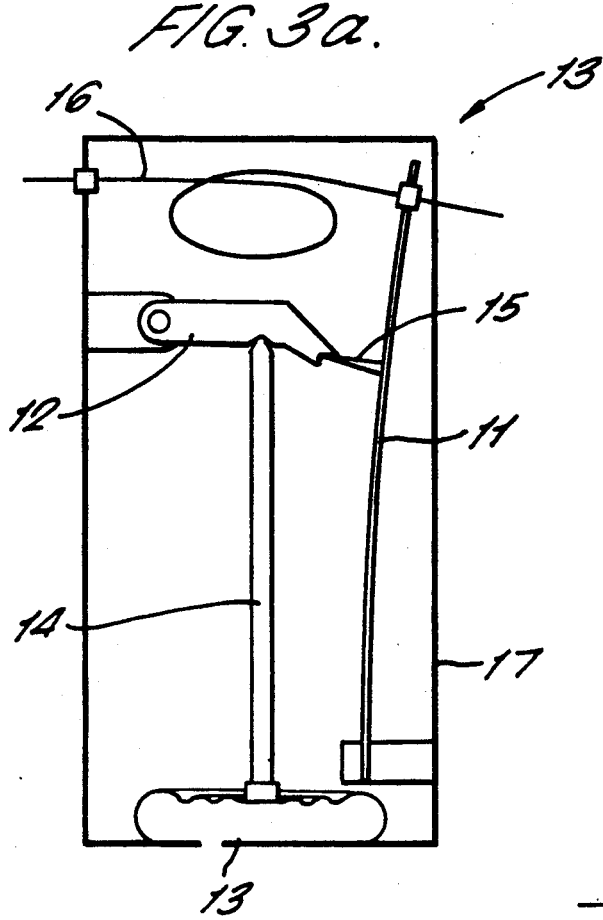
FIG. 3a depicts an actuation device before its vibrational energy has been released.

FIG. 3a shows an actuation device generally indicated by reference numeral 13 which is intended to sense changes in pressure in the device to which it is connected. The actuation device comprises a cantilevered strip 11 which is held in the position shown by a projection 5 which abuts a hinged arm 2.

The strip 11 is attached to a housing 17 at one end and a fibre optic 16 at its other end. The fibre optic 16 is arranged as a loop within the housing 17 being fixed at one end and free to move with the strip 11 at its other end. A diaphragm 13 with a plunger 14 is moveable up and down with changes in pressure below it. When the pressure increases sufficiently, the plunger 14 will push arm 12 upwards and release projection 15 (FIG. 3b). The strip 11 will then vibrate and consequently the loop of fibre optic 16 attached to strip 11 will vibrate. The radius of the loop of fibre 16 will constantly change during vibration and hence there will be changes in the microbending which will cause the light amplitude to be modulated in a damped harmonic fashion.

The design of the actuation device is of critical importance since it must give sufficient modulation to enable the detection electronics to measure the signal and it must not be damped so quickly by the fibre optic itself such that the signal is not long enough for the electronics to measure the frequency.

FIG. 4 is a graph depicting the attenuation of the fibre optic loop (Y-axis) with the radius of the fibre optic loop (X-axis) and shows how the output signal varies with the radius of the fibre optic loop. Clearly, the smaller the radius the higher the signal. However, there are two balancing factors which limit the radius which can be used. First, glass fibre suffers from brittle stress fatigue which is higher for small radii so that as the radius decreases there is a greater risk of breakage. Secondly, the insertion loss of each actuation device 3 increases with small radii and thus reduces the number of actuation devices 3 that can be used in the sensor. Experiments have revealed that the optimum radius when these factors are taken into account is substantially 5-20 mm for a 50/125 type fibre optic.

Clearly, all that is necessary to construct each actuation device 3, with its own natural frequency specific to a parameter of a particular device to be monitored is to change the length or thickness of the strip 1 It will be appreciated that this makes manufacture of the actuation devices relatively simple.

Figure 3B:
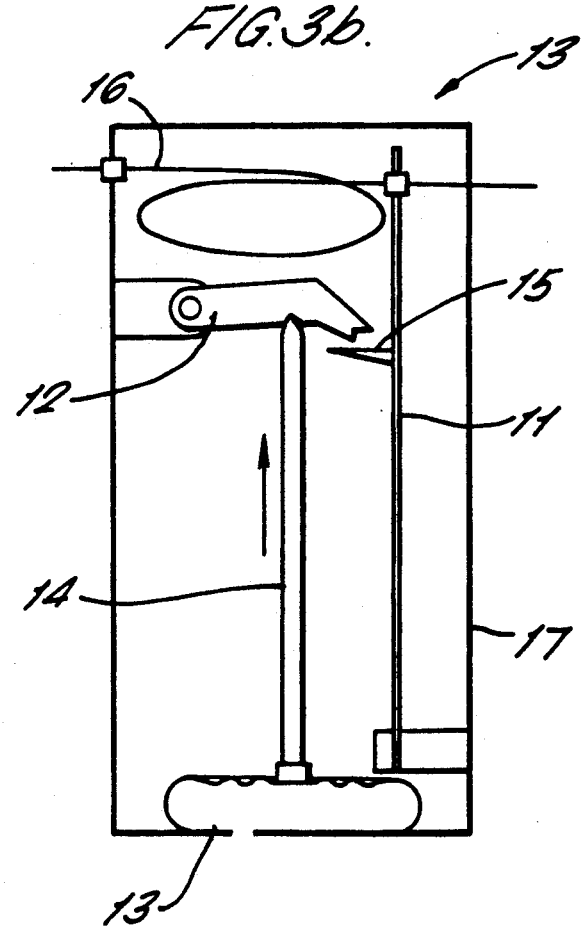
FIG. 3b depicts the actuation device in FIG. 3a after its vibrational energy has been released.
Figure 5A:
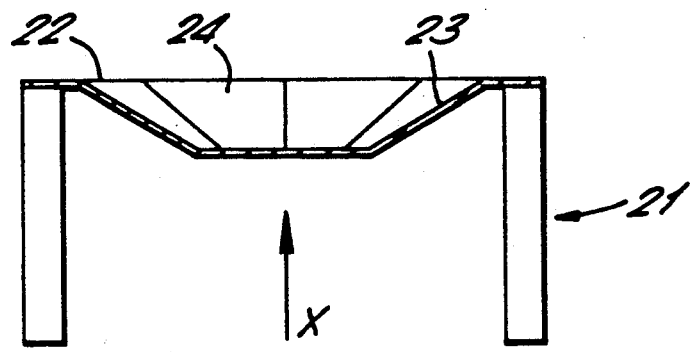
FIGS. 5a, 5b and 5c depict a suitable diaphragm for use in an actuation means of the sensor according to the present invention.
Figure 5B:
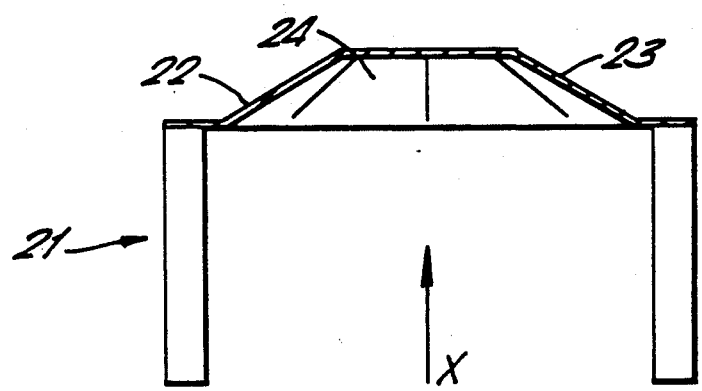
Figure 5C:
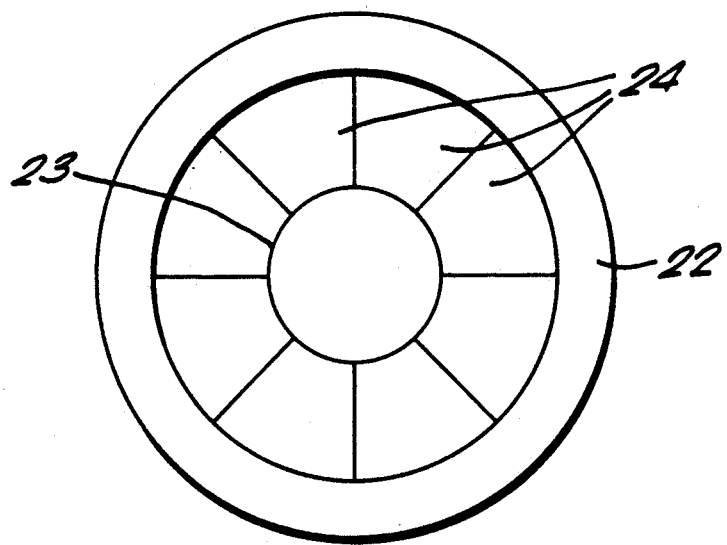

Alternatively, the diaphragm 3 with plunger 4 in FIGS. 3a and 3b could be replaced by a flip-over diaphragm which flips from one position to another as soon as a certain pressure is reached. FIGS. 5a, 5b and 5c depict a suitable diaphragm for this purpose.

FIG. 5a is a side view of the diaphragm generally indicated by reference numeral 21. The diaphragm comprises a thin metal disc 22 which has an indented centre section 23. The centre section 23 comprises eight flattened webs 24. The disc 22 is mechanically stable and will remain in the form shown until a critical pressure is reached. The pressure acting on the disc 12 is shown by arrow X. At the critical pressure the webs 24 will move to a horizontal position and the diaphragm will invert to its second mechanically stable position shown in FIG. 5b. FIG. 5c is a view from above of the diaphragm in FIGS. 5a and 5b. The diaphragm, therefore, only provides a significant mechanical movement over a very small range of pressure close to the critical pressure at which flip-over occurs. Such an arrangement is well suited to the requirements of the sensor since it too is only required to give a signal once the critical pressure is reached. The mechanical movement can be used directly or can be converted by a series of levers to release the vibrational energy. An advantage of this arrangement over that depicted in FIGS. 3a and 3b is that the plunger 14 will give an approximately linear movement with pressure so that the hinged arm 12 could be displaced before the critical pressure is reached.

The sensor of the present invention thus comprises a plurality of actuation devices or sets of actuation devices each having a different natural frequency. The frequency of modulation is not a function of the measured parameter but is completely independant. The point at which the signal is generated depends on a measured parameter changing by a predetermined amount. With a sensor of this type it is possible to identify where the signal generated has originated from. This could be particularly useful in an intruder detection system, for example. A further application would be the sensing of pressure in high voltage capacitors.

There is very little risk that the sensor will malfunction since all that is required is the light source and detection electronics of which the latter are inactive for most of the time. The actuation devices are also unlikely to fail as there are no moving parts until they are activated.

It is envisaged that the present invention could be adapted to sense polarisation modulation rather than amplitude modulation. The polarisation state of a single mode fibre could be altered by deforming it at the particular frequency of the actuation device. A polariser/analyser arrangement could then give an amplitude varying signal of the particular frequency.

It is also envisaged that the present invention could be adapted to amplitude modulate the light extrinsically (i.e outside the fibre). This could be achieved by attaching a shutter to the vibrating strip which passes through a light beam from one fibre to another. Alternatively, the vibrating strip could be attached to one end of a fibre and a second fibre could be placed to collect light from the first fibre. When the spring is released the amount of light collected by the second fibre would vary as the spring vibrates at the particular natural frequency of the actuator thus achieving the modulation required. This type of system will typically require fibre optic connectors at each actuator which makes it more expensive to manufacture. However, it would be much easier to repair such a system as sections can be replaced, unlike in the non-interruptive embodiment.

I claim:

1. A sensor comprising an optical fibre, a light source for passing light through the fibre, a plurality of sets of actuation means, each set having one or more actuation means connecting the fibre to a respective device to be monitored, each actuation means within a set having a stored vibrational energy which is released to modulate the light in the optical fibre when a parameter of the device to which it is connected changes by a predetermined amount and means for converting the optical signal into an electrical signal wherein each set of actuation means has a different natural vibrational frequency thus enabling the sensor to detect from which device the vibration originated by monitoring the change in transmitted light.

2. A sensor as claimed in claim 1 wherein each actuation means comprises a biased spring means which is released when a parameter of the device to which it is connected changes by a predetermined amount.

3. A sensor as claimed in claim 2 wherein one end of the spring means is connected to the optical fibre.

4. A sensor as claimed in claim 2 wherein the vibration of the spring means causes a bending of the optical fibre.

5. A sensor as claimed in claim 2 wherein the optical fibre is arranged as a loop or an arc within the actuation means, one end being fixed to the housing of the actuation means and the other end being connected to the spring means.

6. A sensor as claimed in claim 1 wherein the transmitted light is amplitude modulated extrinsically.

7. A sensor, as claimed in claim 1 further comprising beam splitter/mirror arrangement to enable the light source and means for converting the optical signal to an electrical signal to be at the same location thus requiring only a single length of optical fibre.

8. A sensor as claimed in claim 1 which senses amplitude modulation of light.

9. A sensor as claimed in claim 1 which senses polarisation modulation of light.

10. A sensor as claimed in claim 1 which senses temperature, pressure or current in a high voltage environment.

11. A sensor as claimed in claim 1 which senses pressure in high voltage capacitors.

12. A sensor as claimed in claim 1 wherein one or more of the actuation means are provided with a visible indicator which identifies which actuation means has been activated.

* * * * *